United States Patent
Srinivasan et al.

(10) Patent No.: US 11,048,376 B2
(45) Date of Patent: Jun. 29, 2021

(54) TEXT EDITING SYSTEM FOR 3D ENVIRONMENT

(71) Applicant: Microsoft Technology Licensing, LLC, Redmond, WA (US)

(72) Inventors: Vidya Srinivasan, Issaquah, WA (US); Edward Averett, Bellevue, WA (US); Andrew John Howe, Sammamish, WA (US); Michael Lee Smith, Kirkland, WA (US); Harold Anthony Martinez Molina, Seattle, WA (US); Nathan Bradley Duke, Kirkland, WA (US); Amy Scarfone, Seattle, WA (US); Purnima Rao, Bellevue, WA (US); Colton Brett Marshall, Redmond, WA (US); Aniket Handa, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/413,519

(22) Filed: May 15, 2019

(65) Prior Publication Data

US 2020/0363929 A1 Nov. 19, 2020

(51) Int. Cl.
*G06F 3/0481* (2013.01)
*G02B 27/01* (2006.01)
*G06F 3/0484* (2013.01)
*G06T 19/00* (2011.01)

(52) U.S. Cl.
CPC ....... *G06F 3/04815* (2013.01); *G02B 27/017* (2013.01); *G06F 3/04847* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2009/0055735 | A1 | 2/2009 | Zaleski et al. |
| 2010/0095248 | A1 | 4/2010 | Karstens |
| 2011/0279445 | A1 | 11/2011 | Murphy et al. |
| 2012/0229449 | A1 | 9/2012 | Psistakis et al. |

(Continued)

OTHER PUBLICATIONS

"SharePoint Spaces", Retrieved From: https://web.archive.org/web/20190401134501/https://www.exploresharepointspaces.com/, Apr. 1, 2019, 9 Pages.

(Continued)

*Primary Examiner* — Toan H Vu
(74) *Attorney, Agent, or Firm* — Newport IP, LLC; Scott Y. Shigeta

(57) ABSTRACT

Examples of the present disclosure describe systems and methods for rendering 3D text in a 3D environment. In aspects, a three dimensional (3D) object may be generated in a virtual reality, augmented reality, or mixed reality (MR) environment. A two dimensional (2D) graphical user interface (GUI) texture may be applied to a plane of the 3D object. A graphical control element, such as a text frame, and associated content may be rendered on the GUI texture. In some aspects, the graphical control element may be associated with editing controls that enable the dimensions and/or orientation of the graphical control element to be modified within the boundaries of the GUI texture and/or the 3D object.

19 Claims, 11 Drawing Sheets

(56) References Cited

U.S. PATENT DOCUMENTS

| | | | |
|---|---|---|---|
| 2013/0090101 A1* | 4/2013 | Park | G06F 3/147 455/414.3 |
| 2013/0328871 A1* | 12/2013 | Piemonte | G06T 11/001 345/420 |
| 2013/0328925 A1* | 12/2013 | Latta | G09G 3/003 345/633 |
| 2013/0335405 A1 | 12/2013 | Scavezze et al. | |
| 2014/0143691 A1* | 5/2014 | Huang | H04N 21/4318 715/762 |
| 2014/0267279 A1* | 9/2014 | Kontkanen | G06T 17/05 345/427 |
| 2014/0285619 A1 | 9/2014 | Acquavella et al. | |
| 2015/0049086 A1* | 2/2015 | Morato | G06T 3/0031 345/427 |
| 2015/0091906 A1 | 4/2015 | Dishno | |
| 2015/0249815 A1* | 9/2015 | Sandrew | H04N 13/122 348/47 |
| 2015/0309705 A1 | 10/2015 | Keeler et al. | |
| 2015/0350634 A1* | 12/2015 | Lim | H04N 13/189 348/51 |
| 2015/0358613 A1* | 12/2015 | Sandrew | H04N 13/261 348/36 |
| 2016/0019720 A1* | 1/2016 | Thurber | H04N 13/344 345/419 |
| 2016/0078679 A1 | 3/2016 | Maximo | |
| 2016/0358374 A1* | 12/2016 | Ju | G06T 15/04 |
| 2017/0076429 A1* | 3/2017 | Russell | H04N 13/239 |
| 2017/0169616 A1 | 6/2017 | Wiley et al. | |
| 2018/0286139 A1 | 10/2018 | Moncayo | |
| 2018/0308289 A1 | 10/2018 | Srinivasan et al. | |
| 2019/0111347 A1* | 4/2019 | Rimon | A63F 13/213 |
| 2019/0246238 A1* | 8/2019 | Crutchfield | H04W 4/026 |
| 2019/0251076 A1 | 8/2019 | Yan | |
| 2019/0385371 A1 | 12/2019 | Joyce et al. | |
| 2020/0363930 A1 | 11/2020 | Srinivasan et al. | |
| 2020/0364943 A1 | 11/2020 | Srinivasan et al. | |

OTHER PUBLICATIONS

"Non Final Office Action Issued in U.S. Appl. No. 16/413,542", dated Jul. 13, 2020, 25 Pages.

"Final Office Action Issued in U.S. Appl. No. 16/413,542", dated Nov. 2, 2020, 30 Pages.

"International Search Report and Written Opinion issued in PCT Application No. PCT/US20/028025", dated Sep. 3, 2020, 17 Pages.

"Non Final Office Action Issued in U.S. Appl. No. 16/413,528", dated Aug. 18, 2020, 19 Pages.

"International Search Report and Written Opinion Issued in PCT Application No. PCT/US20/028026", dated Jul. 14, 2020, 11 Pages.

"International Search Report and Written Opinion Issued in PCT Application No. PCT/US20/028378", dated Jul. 24, 2020, 9 Pages.

"Final Office Action Issued in U.S. Appl. No. 16/413,528", dated Jan. 12, 2021, 22 Pages.

"Non-Final Office Action Issued in U.S. Appl. No. 16/413,542", dated Mar. 24, 2021, 34 Pages.

* cited by examiner

TEXT EDITING SYSTEM FOR 3D ENVIRONMENT

BACKGROUND

Authoring and consuming text is challenging in many virtual reality, augmented reality, and mixed reality systems. Given the resolution of current head-mounted displays, reading text in a 3D environment is often difficult (if not impossible) when certain fonts/styles are applied to the text and/or the text is rotated/oriented in certain manners. Authoring text using these head-mounted displays is difficult for similar reasons. Such issues materially detract from the user experience and usability of these systems.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for rendering 2D text in a 3D environment. In aspects, a three dimensional (3D) object may be generated in a virtual reality, augmented reality, or mixed reality (MR) environment. A two dimensional (2D) graphical user interface (GUI) texture may be applied to a plane of the 3D object. A graphical control element, such as a text frame, and associated content may be rendered on the GUI texture. In some aspects, the graphical control element may be associated with editing controls that enable the dimensions and/or orientation of the graphical control element to be modified within the boundaries of the GUI texture and/or the 3D object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
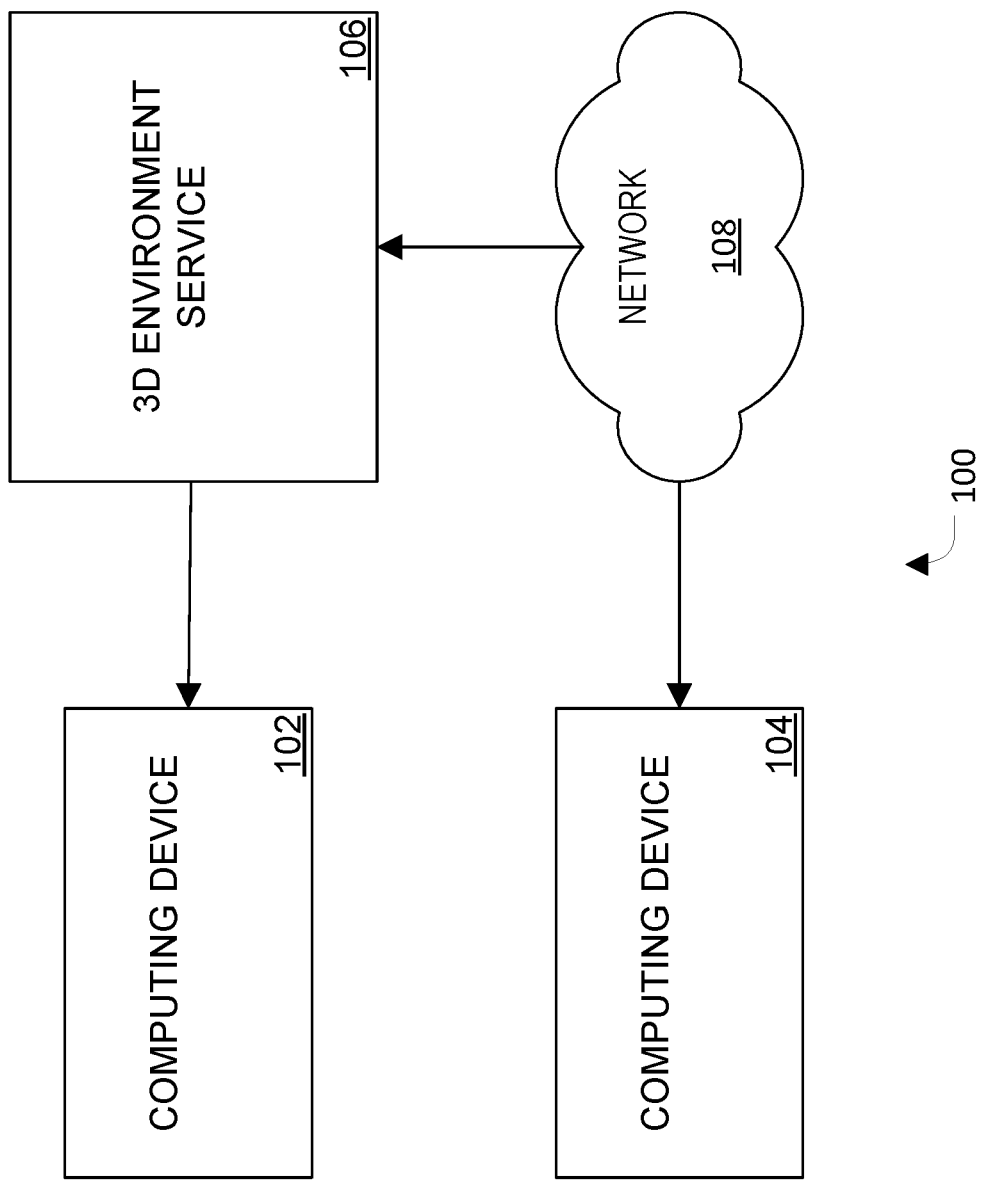
FIG. 1 illustrates an overview of an example system for rendering 2D text in a 3D environment as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Authoring and consuming 3D content, specifically 2D text, presents various challenges in many 3D systems. One such challenge is that many 3D authoring tools are application- or platform-specific. As such, content authored using such tools is often difficult (if not impossible) to read when presented using the authoring and viewing tools of different applications and platforms. For example, a font or style applied to content authored using one text editor may not be available in a different text editor. As another example, a font size or a zoom level applied to content authored using one text editor may cause the content to be unreadable or unsightly when rendered in a different text editor. Another challenge for many 3D systems is the substantial processing cost of rendering updated content in 3D environments. In such systems, when any aspect or property of a 3D object is updated, the entire 3D object (e.g., the object geometry, applied textures, applied graphical control elements, text/image content, etc.), if not the entire 3D environment, is re-rendered/reloaded. As such, updating multiple objects in a 3D environment can severely impact the performance of a 3D system.

To address such challenges in 3D systems, the present disclosure describes systems and methods for rendering 2D text in a 3D environment. In aspects, a virtual reality (VR), augmented reality (AR), or mixed reality (MR) system may be accessible to a user. The system may comprise a head-mounted display (HMD) for presenting an environment comprising two dimensional (2D) and/or three dimensional (3D) content to the user. The content may include, for example, 2D and 3D objects, such as video objects, image objects, control objects, audio objects, and the like. In examples, the system may provide a media utility for authoring, editing, and/or consuming at least text content in the environment. The media utility may be implemented in a cross-platform manner, such that users may author content on a first platform or application, and consume the content on alternate platforms or applications. Such an implementation may enable users of various platforms and devices to author and consume content using familiar features, styles, and tools. In at least one aspect, the media utility may utilize one or more content frames to provide text content. The content frames may be configured to utilize editing controls for altering the size, orientation, and viewing plane(s) of content displayed in the content frames. As one example, the editing controls may enable the 2D attributes of the content frame (e.g., width and height) to be adjusted within the environment. As another example, the editing controls may enable the content frame to be manipulated in 3D space (e.g., pivoting about one or more axes of the environment). Such editing tools may enable users to manipulate content frames as required to improve content readability and avoid content occlusions.

In aspects, the system may render content frames (and corresponding content) in the environment using a specialized rendering mechanic. This rendering mechanic comprises generating or accessing a 3D plane in the environment. The 3D plane may be associated with a 3D object placed in the environment, or the geometry of the environment itself. A 2D GUI texture may be applied to the 3D plane. A GUI texture, as used herein, may refer to a 2D image on which user interface elements may be positioned. In examples, the texture may comprise dimensions that cannot exceed the boundaries of the 3D plane. A graphical control element, such as a text frame, may be rendered on the texture. The text frame may comprise customizable dimensions that do not (and cannot be customized to) exceed the boundaries of the texture. For instance, when the dimensions of the text frame are adjusted, the size of the content it the text frame is adjusted accordingly, while the size of the 3D plane and the texture remain constant. In examples, because only the texture must be reloaded when the texture is updated (as opposed to reloading the entire 3D object), this specialized rendering mechanic reduces the processing requirements for updating textures and properties of 3D objects in the environment.

Accordingly, the present disclosure provides a plurality of technical benefits including but not limited to: providing a cross-platform media authoring/consumption utility that provides familiar features and options to users; increasing the readability of content rendered in a 3D environment by providing various editing controls; and decreasing the time and computing resource requirements for rendering updated content in a 3D environment, among other examples.

FIG. 1 illustrates an overview of an example system for rendering 2D text in a 3D environment as described herein. Example system 100 presented is a combination of interdependent components that interact to form an integrated whole for rendering 3D objects in a 3D environment. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a personal computer (PC), a mobile device (e.g., smartphone/phone, tablet, laptop, personal digital assistant (PDA), etc.) and/or any other electronic computing devices. As an example of a processing device operating environment, refer to the example operating environments depicted in FIGS. 6-9. In other examples, the components of systems disclosed herein may be distributed across multiple devices. For instance, input may be entered on a client device and information may be processed or accessed from other devices in a network, such as one or more server devices.

As one example, system 100 comprises computing devices 102 and 104, 3D environment service 106, and distributed network 108. One of skill in the art will appreciate that the scale of systems such as system 100 may vary and may include more or fewer components than those described in FIG. 1. In aspects, computing devices 102 and 104 may be any of a variety of computing devices, including, but not limited to, the processing devices described above. Computing devices 102 and 104 may be configured to use one or more input options for interacting with 3D environment service 106, such as a head-mounted display device or an alternate 3D visualization system, a keyboard, a pointing/selection device, a microphone, one or more haptic devices, or the like. Computing devices 102 and 104 may be further configured to implement a media editing/consumption utility, such as a text editor. In examples, the media editing/consumption utility may be a standalone system configured for cross-platform and/or cross-application use. Publishing content using the media editing/consumption utility may enable users to read and interact with content as intended by the author using a range of devices and/or applications.

3D environment service 106 may be configured to create and/or present a 3D environment. In aspects, 3D environment service 106 may be, for example, provided as part of an interactive productivity or gaming platform. It will be appreciated that while 3D environment service 106 is illustrated as separate from computing devices 102 and 104, 3D environment service 106 (or one or more components or instances thereof) may be provided separately or collectively by computing devices 102 and/or 104. As a particular example, computing devices 102 and 104 may each provide a separate instance of 3D environment service 106. In such an example, the instance of 3D environment service 106 may be accessed locally on computing device 102 using a stored executable file; whereas, the computing device 104 may access the instance of 3D environment service 106 over a network, such as distributed network 108.

3D environment service 106 may be configured to enable content authors to configure 3D environments. For example, 3D environment service 106 may comprise an authoring component. The authoring component may provide the display of 2D representations of one or more 3D models, which may be selected, positioned, and/or customized by an author to create a 3D environment. A model may comprise one or more content points, which may be used by the author to position content within the 3D environment. In some examples, the authoring component may provide a variety of themes and/or textures to be applied to the 3D environment or models and objects therein. The authoring component may additionally provide a media editing/consumption utility, as described above. The media editing/consumption utility may provide editing controls for content authored using the media editing/consumption utility. The editing controls may enable a user to manipulate dimensions and orientation of the authored content within the 3D environment. In aspects, 3D environment service 106 may additionally comprise a rendering component. The rendering component may use an improved rendering process to render content authored using the media editing/consumption utility. In examples, the rendering process may include applying a 2D texture to a 3D plane of the 3D environment, and rendering content on the 2D texture.

3D environment service 106 may be further configured to enable content consumers (e.g. users) to interact with an authored 3D environment. For example, 3D environment service 106 may comprise a viewing component. The viewing component may be used to view, explore, and/or interact with a 3D environment. In some examples, the viewing component may be a web-based application that is accessible via a web browser of the user. In other examples, the viewing component may be an executable application that is locally stored on a device of the user. The viewing component may populate the rendered 3D environment with content at various content points of the one or more models, based on an environment data file. The environment data file may comprise information associated with the models (e.g., a model identifier, a model type, etc.), positioning information (e.g., coordinates, anchor point identifiers, etc.), content information (e.g., content to be displayed, a reference to content, etc.), and custom resources (e.g., custom textures, sounds, etc.), among other information.

Figure 2:
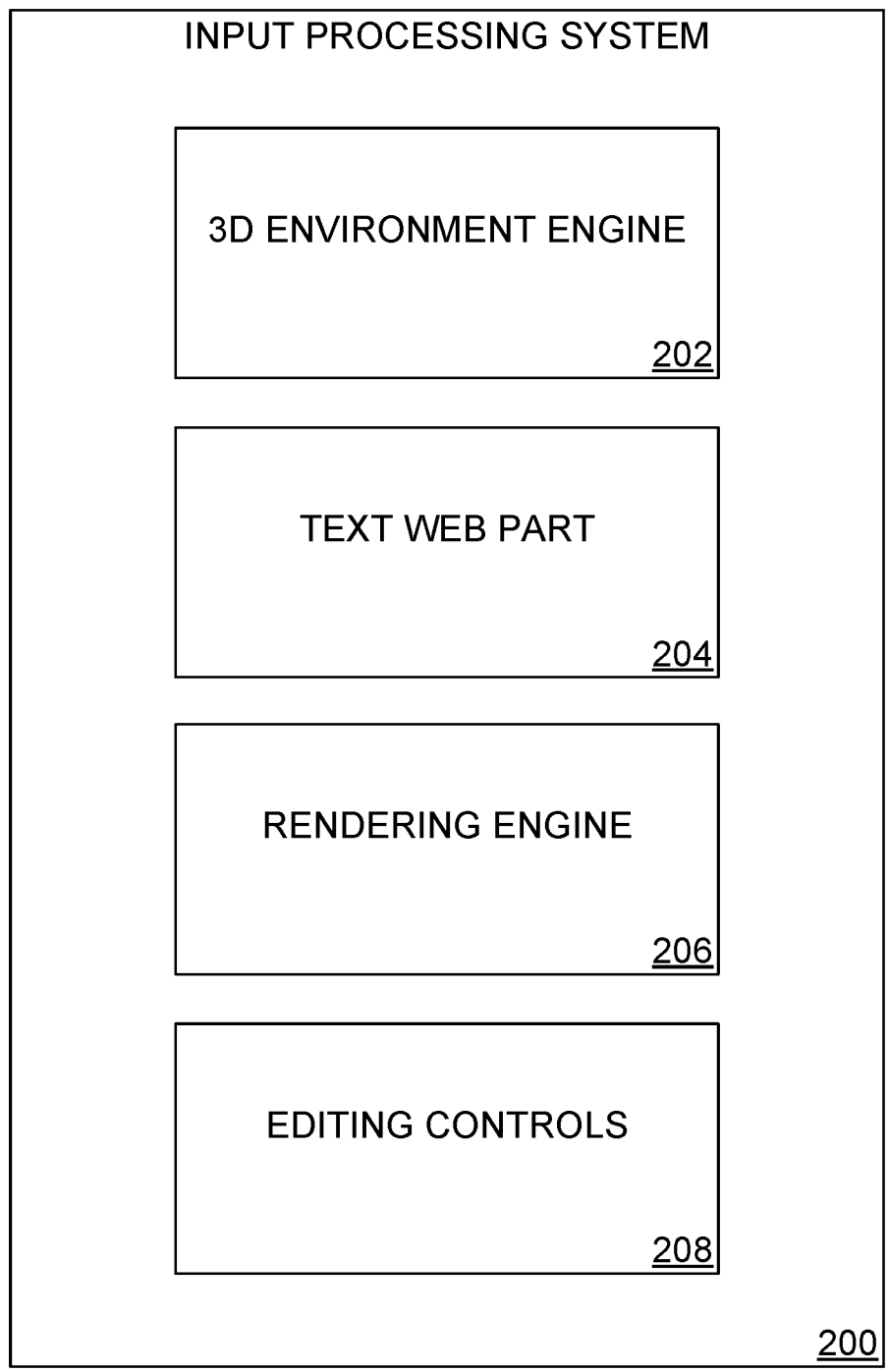
FIG. 2 illustrates an example input processing unit for rendering 2D text in a 3D environment as described herein.

FIG. 2 illustrates an overview of an example input processing system 200 for rendering 2D text in a 3D environment as described herein. The rendering techniques implemented by input processing system 200 may comprise the rendering techniques and data described in the system of FIG. 1. In some examples, one or more components (or the functionality thereof) of input processing system 200 may be distributed across multiple devices. In other examples, a single device (comprising at least a processor and/or memory) may comprise the components of input processing system 200.

With respect to FIG. 2, input processing system 200 may comprise 3D environment engine 202, text web part 204, rendering engine 206, and editing controls 208. In aspects, 3D environment engine 202 may be configured to provide a 3D environment comprising various 2D/3D models and objects. 3D environment engine 202 may enable authors (e.g., content creators or editors) and users (e.g., content consumers) to interact with the 2D/3D models and objects of the 3D environment using various tools and utilities. Interacting with the 2D/3D models and objects may involve, for example, generating, selecting, positioning, orienting, texturing, coloring, or otherwise editing the models, objects, and content in the 3D environment. It will be appreciated that, while text web part 204, editing controls 206, and rendering engine 208 are illustrated as separate from 3D environment engine 202, one or more of elements 204, 206, and 208 (or the functionality thereof) may be incorporated into 3D environment engine 202. As one example, the rendering functionality of rendering engine 208 and aspects of text web part 204 may be incorporated into 3D environment engine 202.

Text web part 204 may be configured to enable authors and users to edit text in the 3D environment. In aspects, text web part 204 may be a media editing utility for generating, modifying, and viewing content in the 3D environment. Text web part 204 may be a standalone system configured for cross-platform and/or cross-application use. For example, text web part 204 may be implemented as a plugin or an add-on for multiple applications and/or devices. Alternately, text web part 204 may be implemented as a dedicated utility for input processing system 200 and/or a 3D service, such as 3D environment service 106. In examples, text web part 204 provide features and options that enable users to read and interact with content in the 3D environment as intended by the author. For instance, text web part 204 may provide for features, such as horizontal and vertical text alignment, auto-wrap, familiar fonts and styles, and a recognizable property panel. In at least one example, the property panel provided by text web part 204 may comprise a limited set of available properties. The set of available properties may represent those properties that may be adjusted while minimizing the threat of making the content displayed in the 3D environment illegible, occluded, or unsightly. For instance, the set of available properties may place a limit on the zoom level and or font size that may be used in the 3D environment. In some aspects, determining which properties to make available in the property panel may be a manual decision of the author. In other aspects, determining which properties to make available in the property panel may be performed automatically using a set of rules, decision logic, or a presentation algorithm. For instance, text web part 204 may use a presentation algorithm to calculate allowable scaling in the 3D environment based on image resolution properties of objects and the estimated font sizes for detected text.

Rendering engine 206 may be configured to render content generated using text web part 204. In aspects, content generated using text web part 204 may be provided to (or otherwise accessible by) rendering engine 206. Rendering engine 206 may implement improved rendering techniques that reduce the processing requirements for updating textures and properties of objects in a 3D environment. For example, to render 3D content in the 3D environment, rendering engine 206 may generate or access a 3D plane in the 3D environment. Rendering engine 206 may apply a 2D texture to at least a portion of the 3D plane. Rendering engine 206 may apply a graphical control element to the 2D texture, such that the dimensions of the graphical control element do not exceed the dimensions of the 2D texture. Rendering engine 206 may then render content to the graphical control element. In examples, the improved rendering techniques of rendering engine 206 provide that, when the 2D texture or content pf the 2D texture is modified, neither the entire 3D environment nor an entire 3D object need be reloaded. Instead, only the 2D texture applied to the 3D object is reloaded; thus, providing a substantial reduction in the processing costs associated with updating 3D environments.

Editing controls 208 may be configured to manipulate aspects of the graphical control element. In aspects, editing controls 208 may be applied to one or more objects in the 3D environment. Editing controls 208 may enable the dimensions and orientation of the objects to be modified. For example, editing controls 208 may be applied to the graphical control element to enable the width and height of the graphical control element to be adjusted. As another example, editing controls 208 may be applied to the graphical control element to enable the graphical control element to be rotated about one or more axes in 3D space.

Having described various systems that may be employed by the aspects disclosed herein, this disclosure will now describe one or more methods that may be performed by various aspects of the disclosure. In aspects, method 300 may be executed by an execution environment a system such as system 100 of FIG. 1 or system 200 of FIG. 2. However, method 300 is not limited to such examples. In other aspects, method 300 may be performed on an application or service providing a 3D environment. In at least one aspect, method 300 may be executed (e.g., computer-implemented operations) by one or more components of a distributed network, such as a web service/distributed network service (e.g. cloud service).

Figure 3:
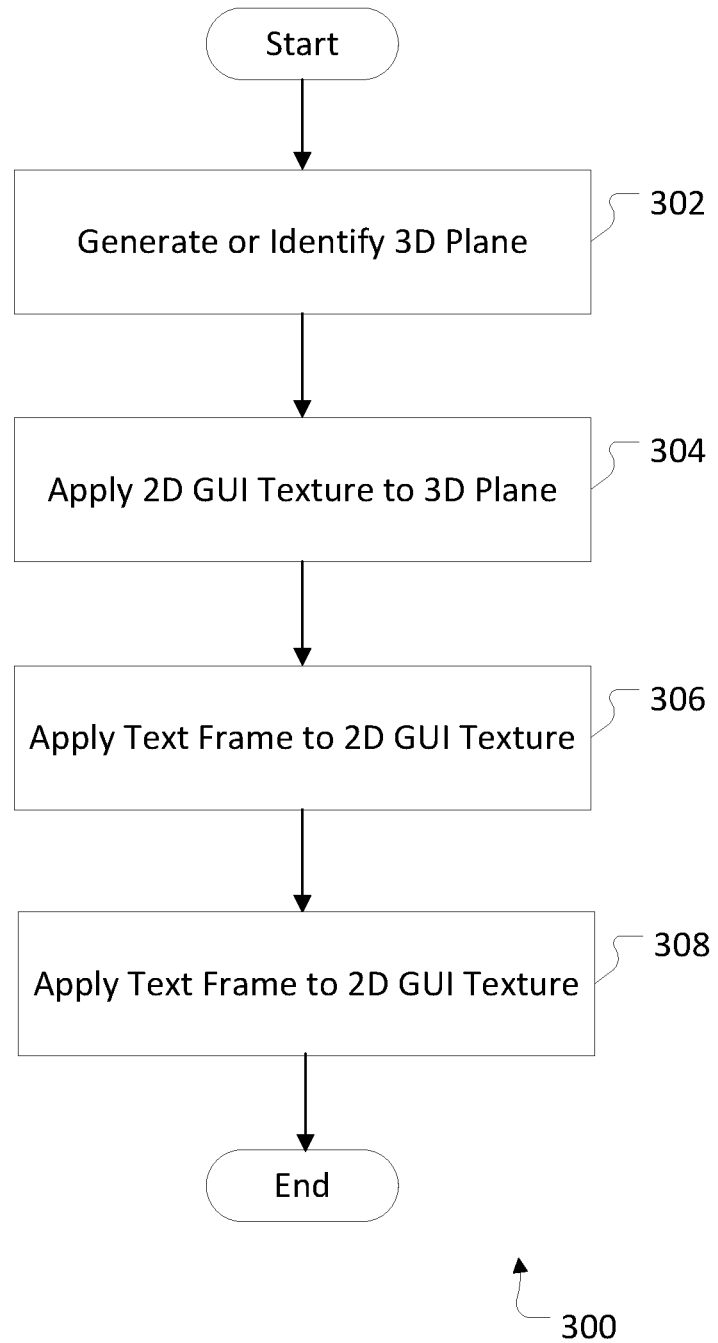
FIG. 3 illustrates an example method for rendering 2D text in a 3D environment as described herein.

FIG. 3 illustrates an example method 300 for rendering 3D text in a 3D environment, as described herein. Although method 300 is described herein with respect to a VR environment, it will be appreciated that the techniques of method 300 may also be applied to other 3D environments, such as AR and MR environments. In aspects, a 3D application/service, such as 3D environment service 106, may provide a 3D environment comprising various 2D and/or 3D objects. The 3D application/service may utilize a rendering component, such as rendering engine 206. The rendering component may be used to render various 2D and 3D objects, models, and utilities available to the 3D environment. In examples, at least one of the rendered objects may be a text web part that provides features and options that enable users to read and interact with 3D content in the 3D environment.

Example method 300 begins at operation 302, where a 3D plane is generated or identified in order to render 3D content. In aspects, a 3D plane in a 3D environment may be generated or identified by the rendering component. The 3D plane may be associated with a 3D model or object placed in the environment, or the geometry of the environment itself.

At operation 304, a 2D GUI texture may be applied to the 3D plane. In aspects, the rendering component may apply a 2D GUI texture to at least a portion of the 3D plane. Applying the 2D GUI texture may comprise placing the 2D GUI texture over a portion of the 3D plane. In examples, the 2D GUI texture may applied such that the dimensions of the 2D GUI texture do not exceed the boundaries of the 3D plane.

At operation 306, a text frame may be applied to the 2D GUI texture. In aspects, a text frame (or an alternate graphical control element) may be applied to at least a portion of the 2D GUI texture. Applying the text frame may comprise placing the text frame over a portion of the 2D plane that is applied to the 3D plane. In examples, the text frame may applied such that the dimensions of the text frame do not exceed the boundaries of the 2D GUI texture. Content, such as text or an image, may then be entered into the text frame using a media editing utility, such as text web part 204.

At operation 308, the text frame may be rendered. In aspects, the text frame may be rendered in the 3D environment using a 3D rendering component, such as rendering engine 206. Rendering the text frame may include rendering the 3D plane, the 2D GUI texture, the text frame, and/or content entered into the text frame in the 3D environment. In examples, one or more of the rendered objects, such as the 3D plane and/or the 2D GUI texture, may be transparent or semi-transparent in the 3D environment. In some aspects, the dimensions of the text frame may be adjustable within the boundaries of 2D GUI texture. In such aspects, when the dimensions of the text frame are adjusted, the attributes of the content in the text frame may be adjusted accordingly, while the size of the 3D plane and the 2D GUI texture remain constant. For example, when the dimensions of the text frame are decreased, the font size of the text in the text frame may be decreased and/or the auto-wrap feature may be used to reduce the amount of text per line of the text frame.

Figure 4A:
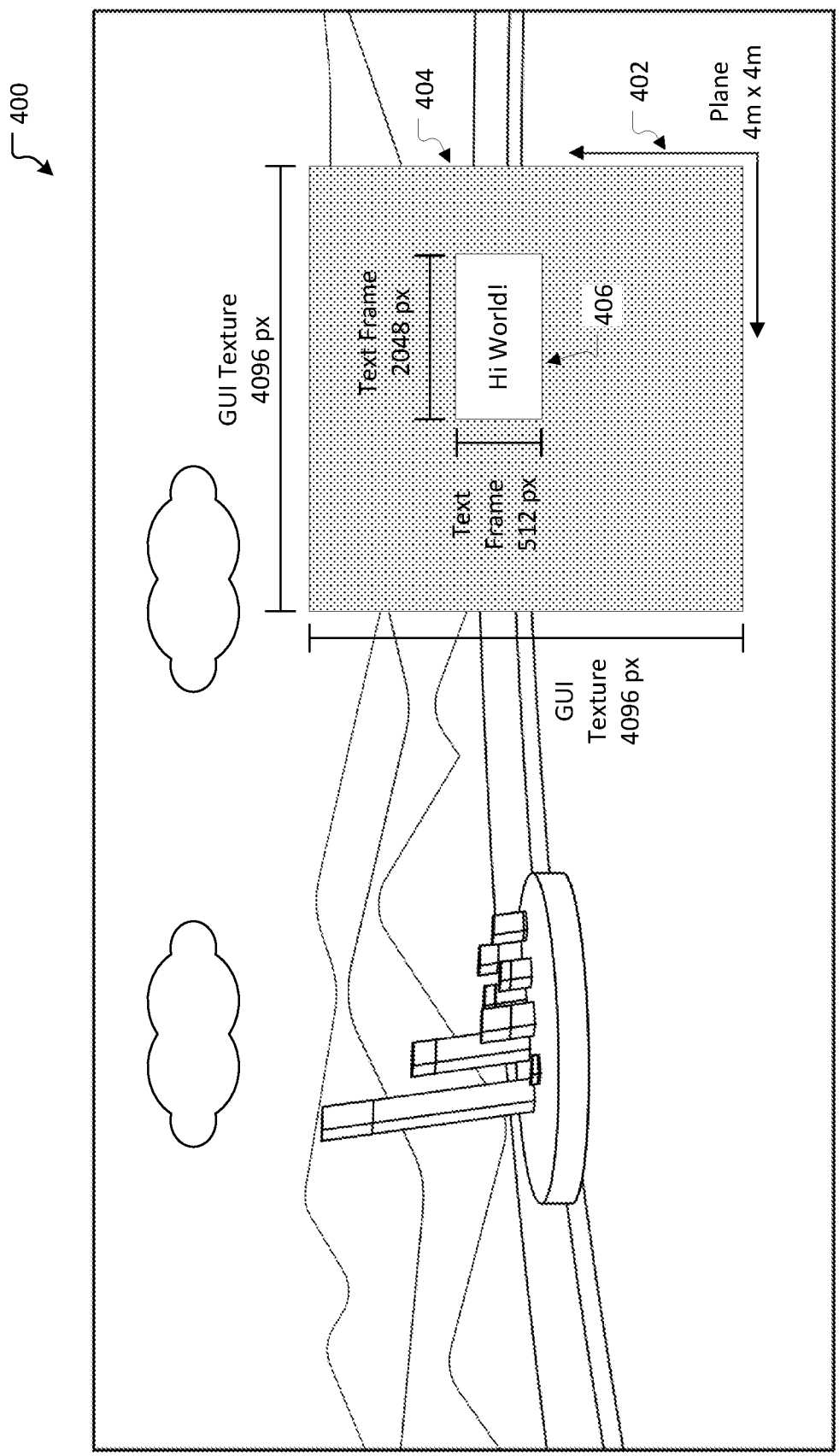
FIGS. 4A and 4B illustrate an example 3D environment for rendering 3D content as described herein.
Figure 4B:
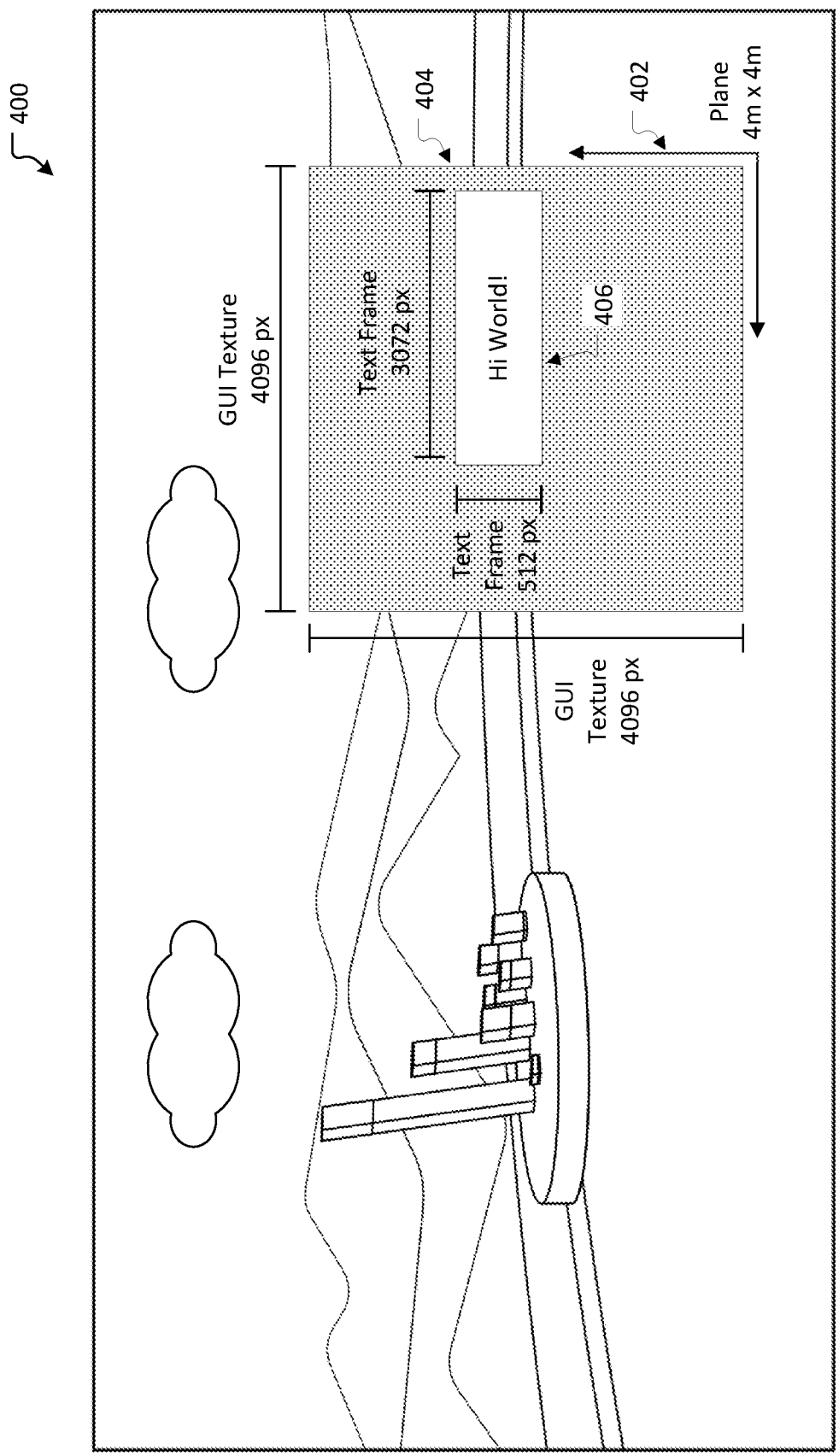

FIGS. 4A and 4B illustrate an example 3D environment 400 for rendering 3D content. In aspects, 3D environment 400 may comprise 3D plane 402, 2D GUI texture 404, and content frame 406. 3D plane 402 may represent any plane in the 3D space of 3D environment 400. In the specific example illustrated in FIGS. 4A and 4B, 3D plane 402 extends along the x- and y-axes of 3D environment 400 and comprises an area that is 4 meters by 4 meters. 2D GUI texture 404 is a texture applied to 3D plane 402. 2D GUI texture 404 is applied within the boundaries of 3D plane 402 and may not extend beyond the boundaries of 3D plane 402. In the specific example illustrated in FIGS. 4A and 4B, the area of 2D GUI texture 404 is 4096 pixels by 4096 pixels. Content frame 406 is a text frame applied to 2D GUI texture 404. Content frame 406 is applied within the boundaries of 2D GUI texture 404 and 3D plane 402, and may not extend beyond the boundaries of 2D GUI texture 404 or 3D plane 402. In the specific example illustrated in FIG. 4A, the area of content frame 406 is 2048 pixels by 512 pixels. In aspects, the area of content frame 406 may be modified without modifying the area size of 2D GUI texture 404 and 3D plane 402. For example, as illustrated in FIG. 4B, the area of content frame 406 increased to 3072 pixels by 512 pixels, while the area of 2D GUI texture 404 remained 4096 pixels by 4096 pixels and the area of 3D plane 402 remained 4 meters by 4 meters.

Figure 5B:
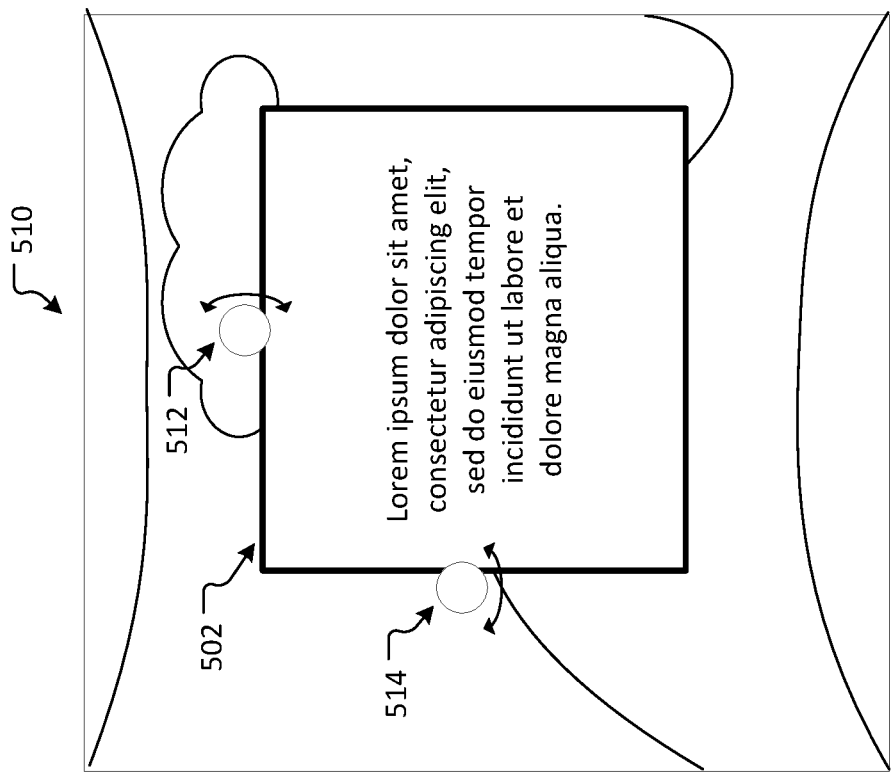
FIGS. 5A and 5B illustrate example views of editing controls for manipulating aspects of a graphical control element in a 3D environment.
Figure 5A:
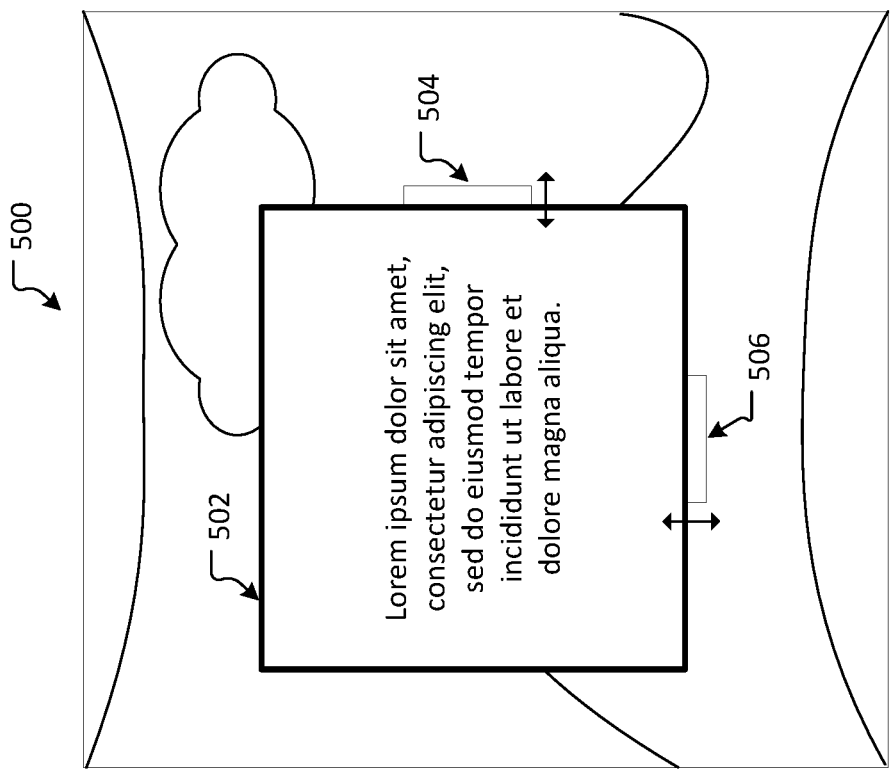

FIGS. 5A and 5B illustrate example views 500 and 510 of editing controls for manipulating aspects of a graphical control element. In aspects, one or more editing controls may be applied to objects in the 3D environment discussed herein. The editing controls may enable various properties of the objects to be modified by authors and/or users accessing the 3D environment. In the specific example illustrated in FIG. 5A, view 500 comprises text frame 502 and editing controls 504 and 506. Editing controls 504 and 506 may respectively adjust the width and height of text frame 502 in 2D space. In examples, modifying the dimensions of text frame 502 does not modify the dimensions of text frame 502 in 3D space. In the specific example illustrated in FIG. 5B, view 510 comprises text frame 502 and editing controls 512 and 514. Editing controls 512 and 514 may respectively adjust the rotation of text frame 502 about the x- and y-axes. It will be appreciated that text frame 502 may comprise more or fewer editing controls than illustrated, and the editing controls may control rotation about more, fewer, or alternate axes of rotations from those described above.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
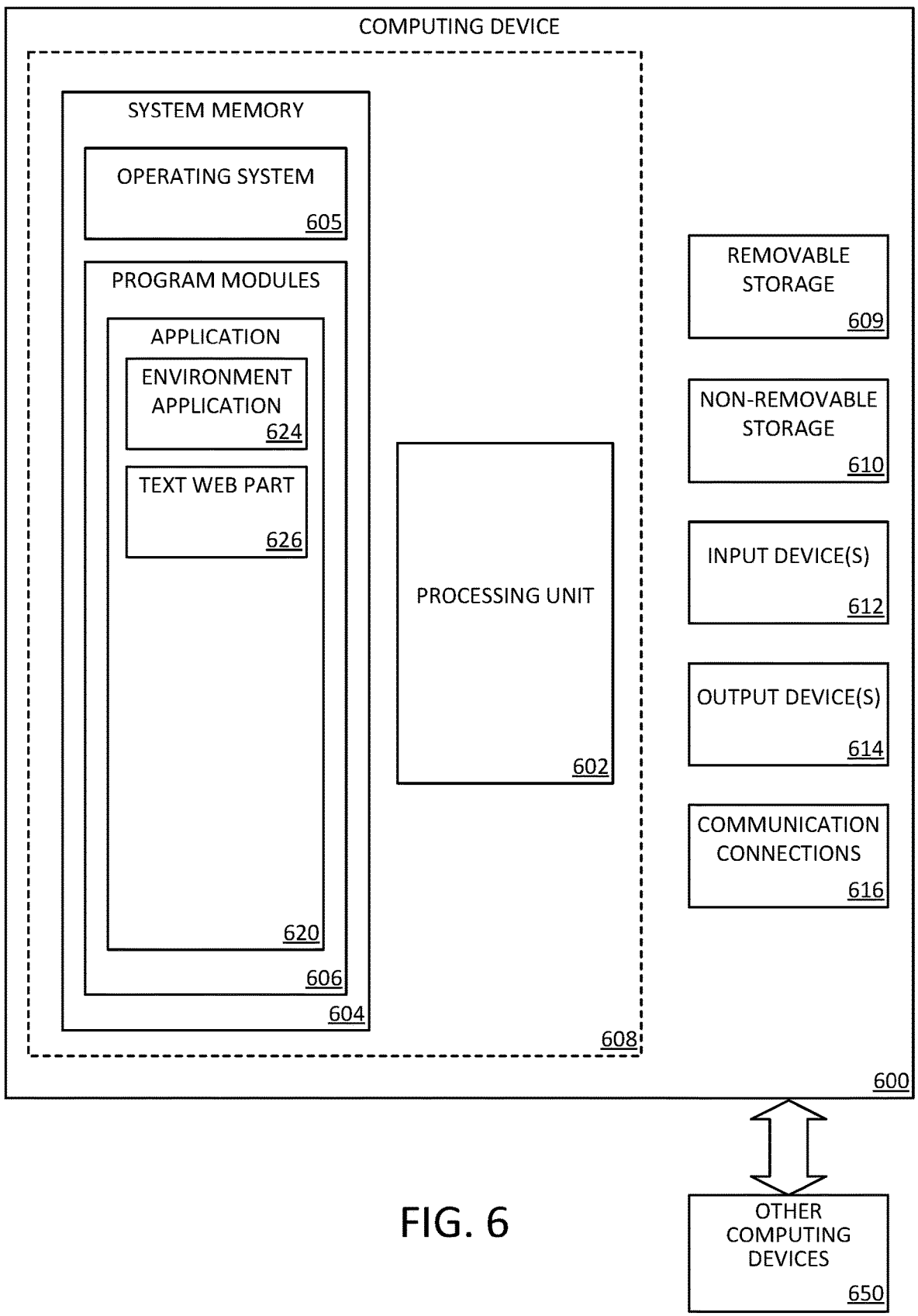
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including the computing devices 102 and 104 and the 3D environment service 106. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may 3D environment application 624 and text web part 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
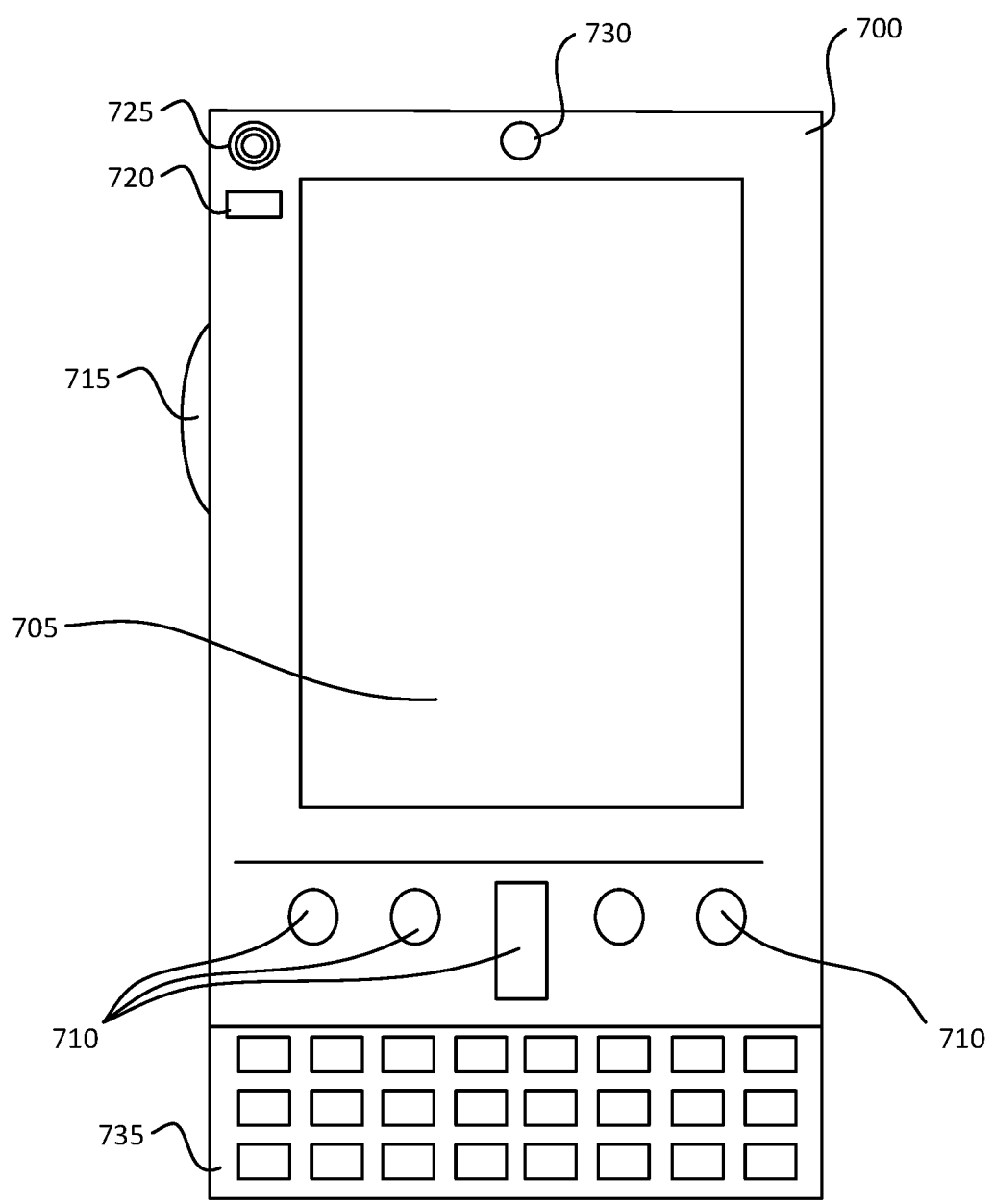
FIGS. 7A and 7B are simplified block diagrams of a mobile computing device with which aspects of the present disclosure may be practiced.
Figure 7B:
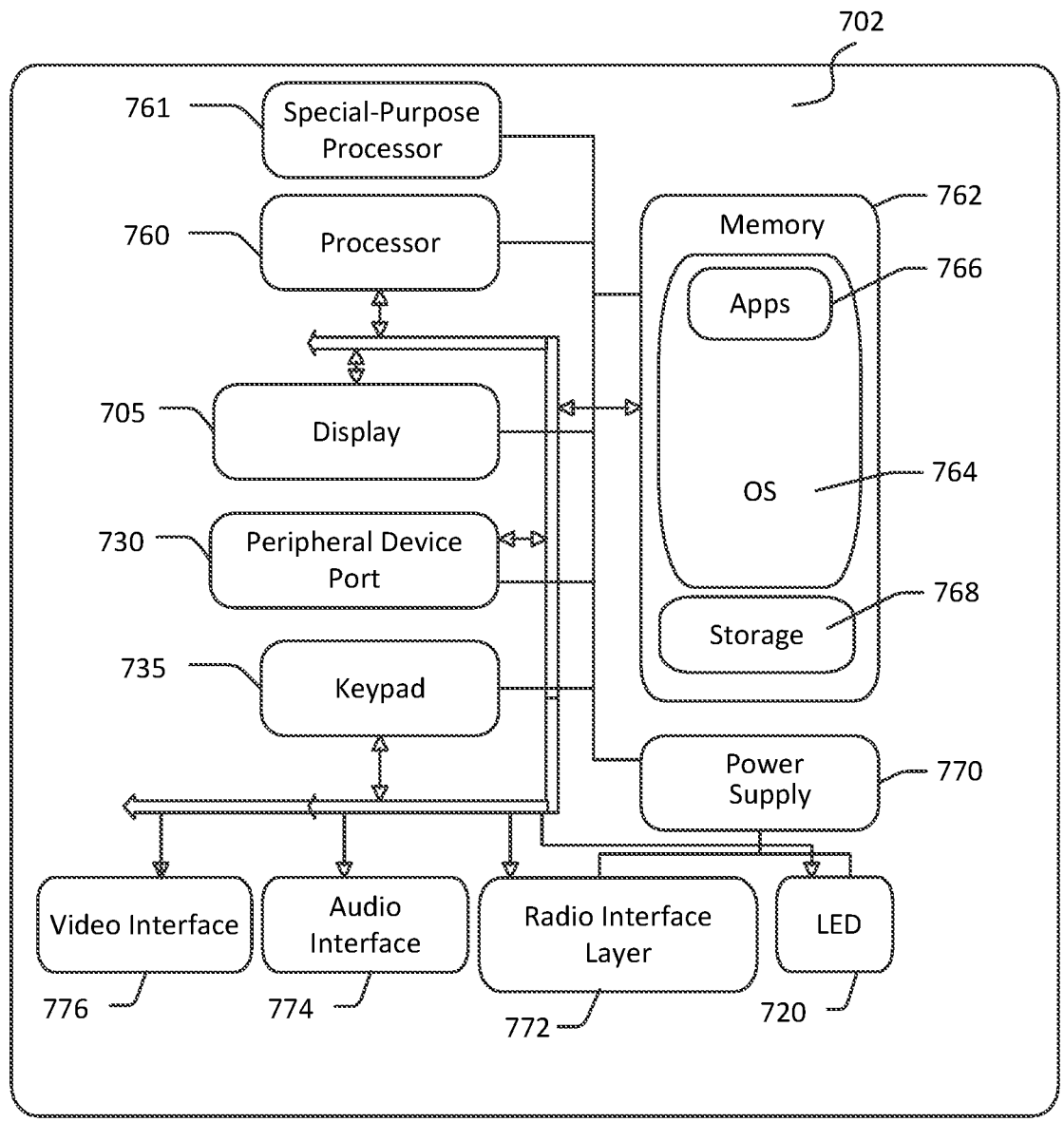

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
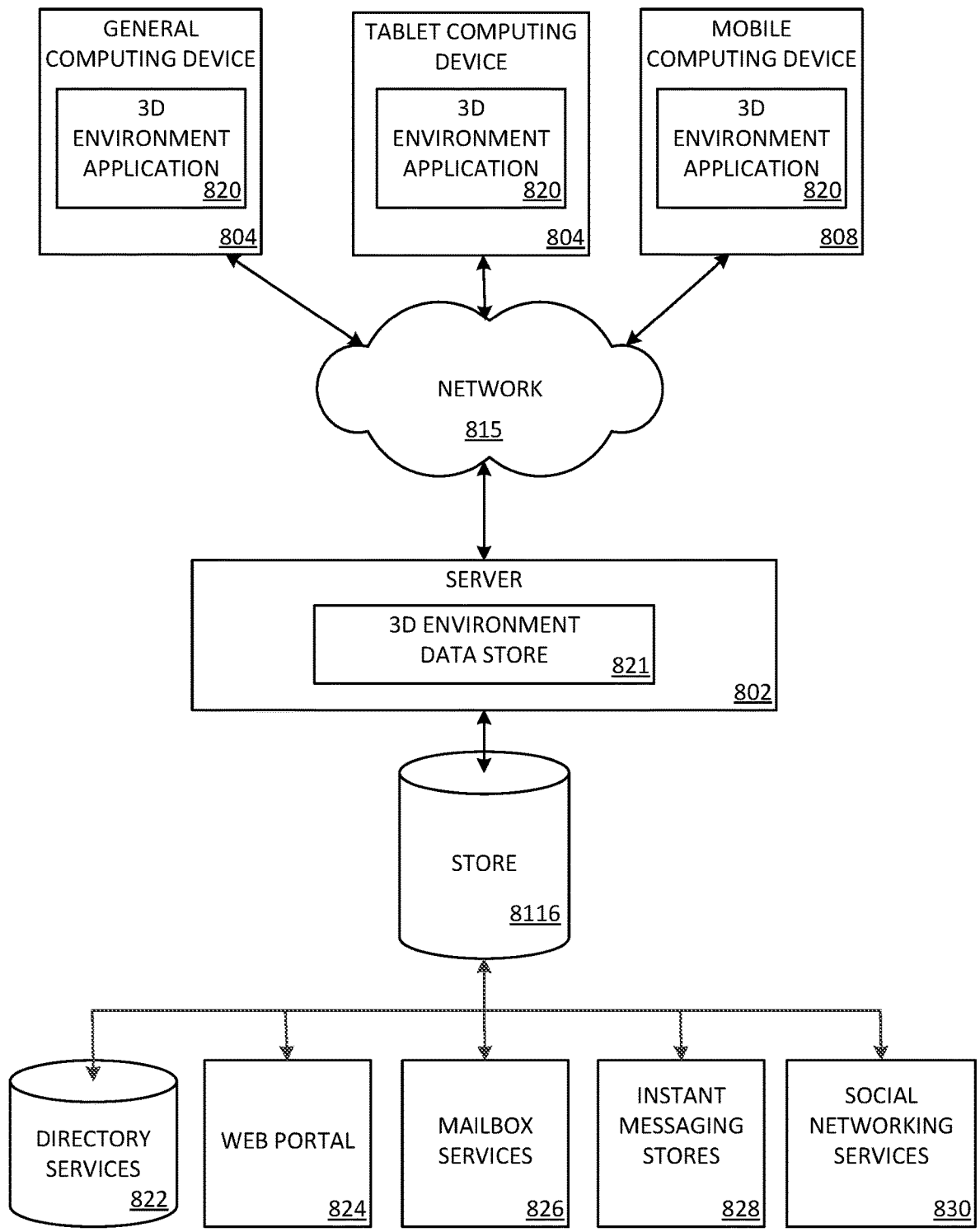
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A 3D environment application 820 may be employed by a client that communicates with server device 802, and/or the 3D environment data store 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
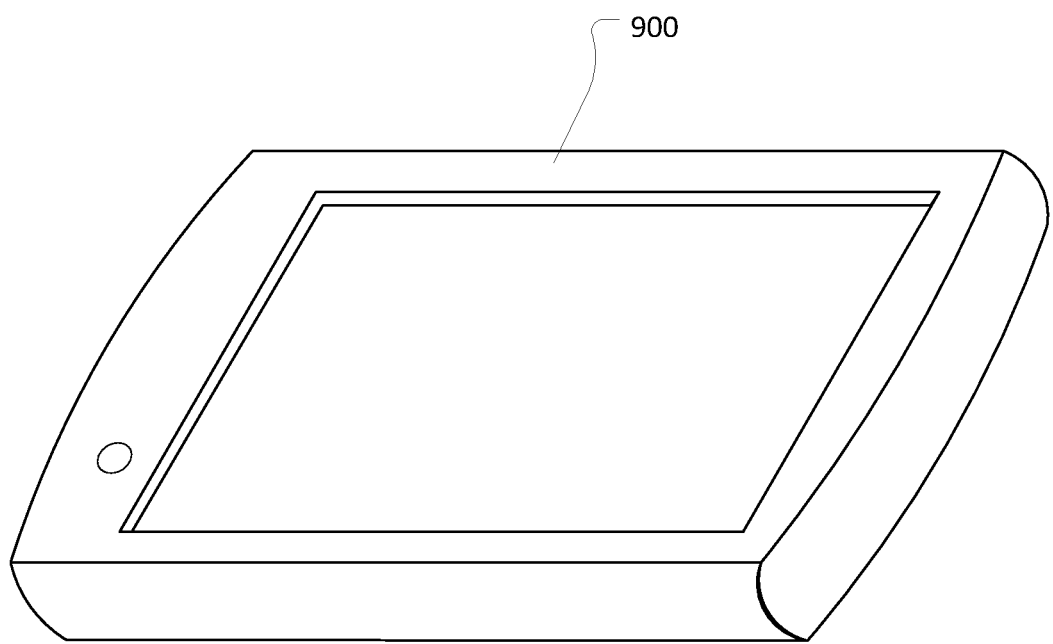
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for rendering 2D text in a 3D environment comprising:
    one or more processors; and
    memory coupled to at least one of the one or more processors, the memory comprising computer executable instructions that, when executed by the at least one processor, performs a method comprising:
        identifying a 3D plane in the 3D environment comprising at least one of a virtual reality (VR), augmented reality (AR), or mixed reality (MR) environment;
        displaying a 2D graphical user interface (GUI) texture on at least a portion of the 3D plane;
        inserting a 2D text frame in at least a portion of the 2D GUI texture, wherein dimensions of the 3D plane and dimensions of the 2D GUI texture remain constant when dimensions of the 2D text frame are modified, wherein the 2D GUI texture is a two-dimensional object displayed within the 3D environment; and
        rendering the 2D text frame comprising the 2D GUI texture in the 3D environment.

2. The system of claim 1, wherein the 3D environment is accessed using a head-mounted display device.

3. The system of claim 1, wherein rendering the 2D text frame in the 3D environment comprises rendering in the 3D environment at least one of the 3D plane and the 2D GUI texture.

4. The system of claim 1, the method further comprising:
    using one or more editing controls of the 2D text frame to modify the dimensions of the 2D text frame in 3D space, wherein modifying the dimensions of the 2D text frame does not cause the 2D GUI texture to be reloaded in the 3D environment.

5. The system of claim 1, the method further comprising:
    applying content to the 2D text frame; and
    rendering the content when rendering the 2D text frame.

6. The system of claim 1, the method further comprising:
    accessing, in the 3D environment, a media editor;
    using the media editor to update content of the 2D text frame; and
    rendering, in the 3D environment, the updated content, wherein rendering the updated content comprises updating the 2D GUI texture.

7. The system of claim 6, wherein the media editor is a cross-platform, stand-alone system made accessible to the 3D environment.

8. The system of claim 6, wherein the media editor is associated with a property panel comprising a set of properties relating to the 2D text frame.

9. The system of claim 8, wherein each property in the set of properties is associated with an available range of property values, wherein the available range of property values comprise property values that do not render the content of the 2D text frame illegible.

10. The system of claim 9, wherein determining the available range of property values comprises using at least one of a set of rules, decision logic, or a presentation algorithm.

11. A method for rendering 2D text in a 3D environment comprising:
    identifying a 3D plane in the 3D environment comprising at least one of a virtual reality (VR), augmented reality (AR), or mixed reality (MR) environment;
    displaying a 2D graphical user interface (GUI) texture on at least a portion of the 3D plane;
    inserting a 2D text frame in at least a portion of the 2D GUI texture, wherein dimensions of the 3D plane and dimensions of the 2D GUI texture remain constant when dimensions of the 2D text frame are modified, wherein the 2D GUI texture is a two-dimensional object displayed within the 3D environment; and
    rendering the 2D text frame comprising the 2D GUI texture in the 3D environment.

12. The method of claim 11, wherein rendering the 2D text frame in the 3D environment comprises rendering in the 3D environment at least one of the 3D plane and the 2D GUI texture.

13. The method of claim 11, wherein the dimensions of the 2D text frame are not configurable to exceed the dimensions of the 2D GUI texture.

14. The method of claim 11, further comprising:
    using one or more editing controls of the 2D text frame to modify the dimensions of the 2D text frame in 2D space, wherein modifying the dimensions of the 2D text frame does not cause the 2D GUI texture to be reloaded in the 3D environment.

15. The method of claim 11, further comprising:
    entering text to the 2D text frame; and
    rendering the text in 3D when rendering the 2D text frame.

16. The method of claim 11, further comprising:
    accessing, in the 3D environment, a media editor;
    using the media editor to update the text of the 2D text frame; and rendering, in the 3D environment, the updated text, wherein rendering the updated text comprises updating the 2D GUI texture without reloading the 3D plane.

17. The system of claim 12, wherein the media editor is a cross-platform, stand-alone system made accessible to the 3D environment.

18. The system of claim 17, wherein the media editor is associated with a property panel comprising one or more properties relating to the 2D text frame, wherein the one or more properties are each associated with property values that do not cause the text of the 2D text frame to be illegible when the 2D text frame is rendered.

19. A computer storage medium comprising computer executable instructions that, when executed by at least one processor of a computing device, performs a method comprising:
   identifying a 3D plane in a 3D environment of a 3D system, the 3D environment comprising at least one of a virtual reality (VR), augmented reality (AR), or mixed reality (MR) environment;
   displaying, using a rendering engine, a 2D graphical user interface (GUI) texture on at least a portion of the 3D plane;
   inserting, using the rendering engine, a 2D text frame in at least a portion of the 2D GUI texture, wherein dimensions of the 3D plane and dimensions of the 2D GUI texture remain constant when dimensions of the 2D text frame are modified, wherein the 2D GUI texture is a two-dimensional object displayed within the 3D environment; and
   rendering, using the rendering engine, the 2D text frame comprising the 2D GUI texture in the 3D environment.

* * * * *